Figure 1:
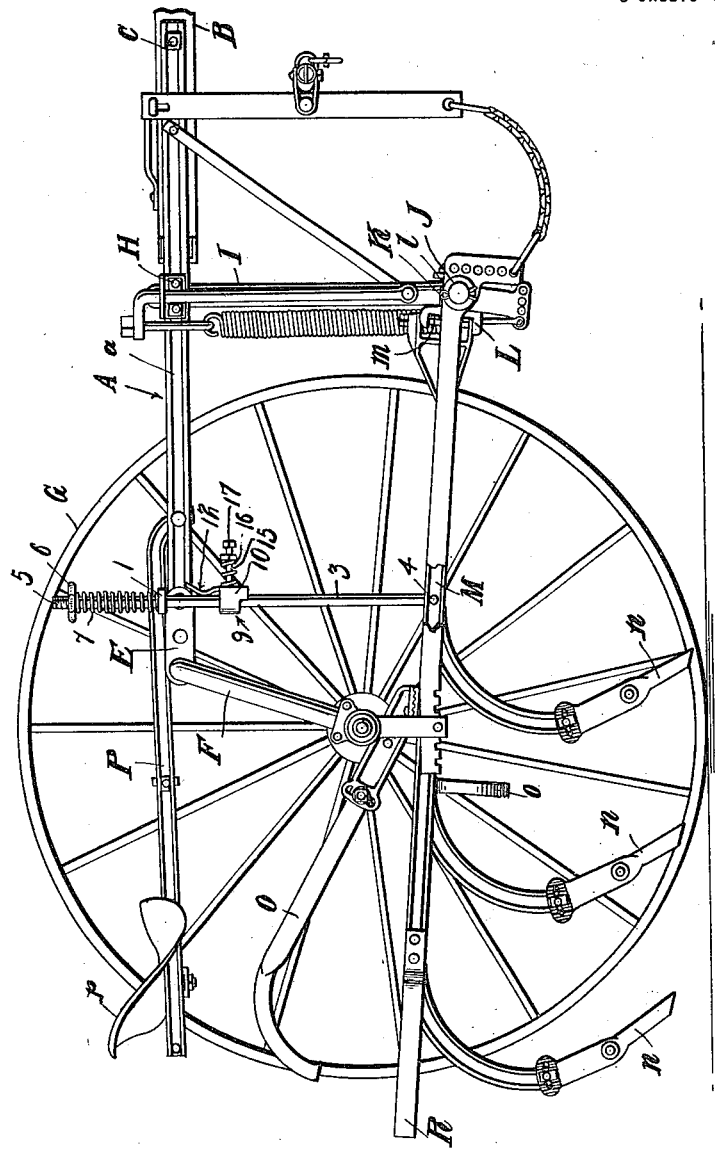

W. L. BEALL.
CULTIVATOR.
APPLICATION FILED JUNE 24, 1914.

1,143,248.

Patented June 15, 1915.
3 SHEETS—SHEET 1.

Witnesses
Wm. F. Doyle.
Robt. E. Barry.

Inventor
William L. Beall
By
Attorneys

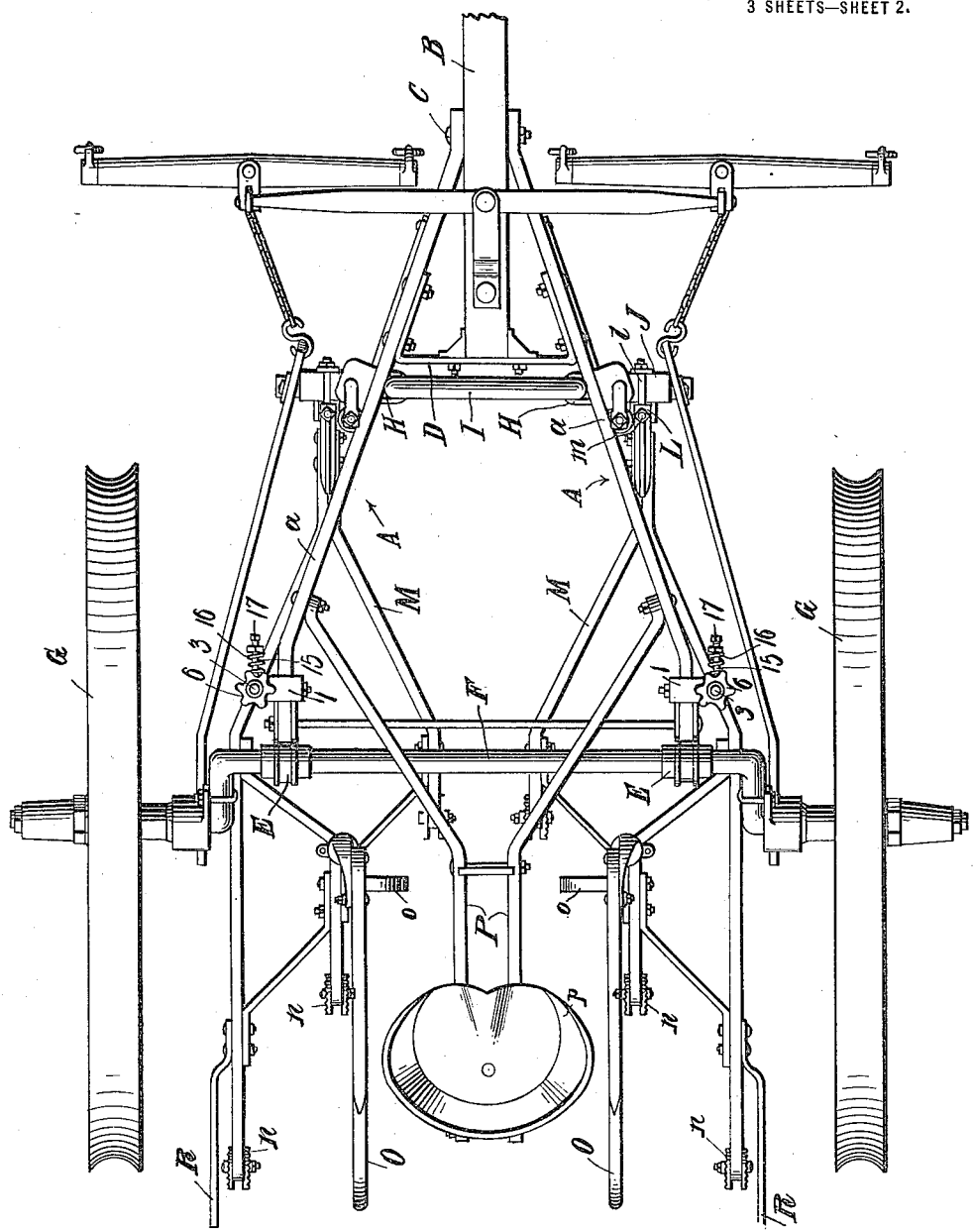

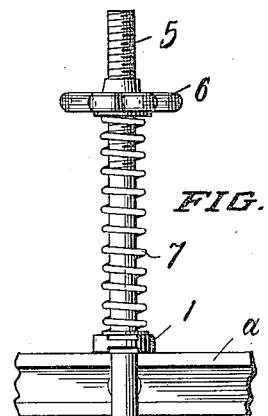
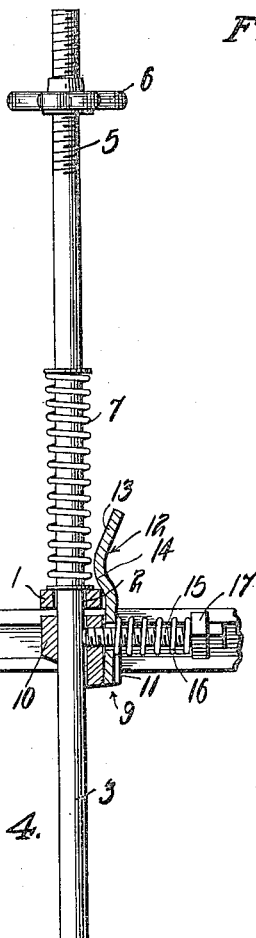
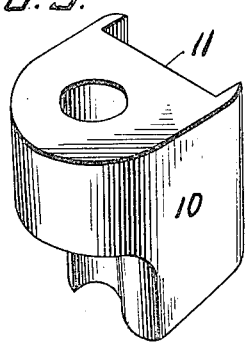
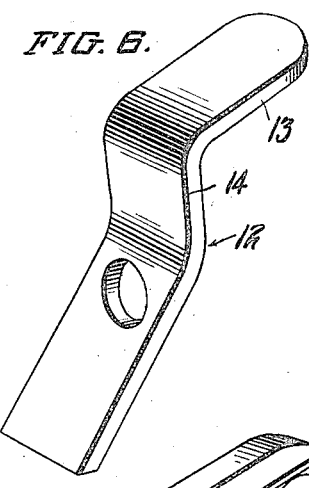
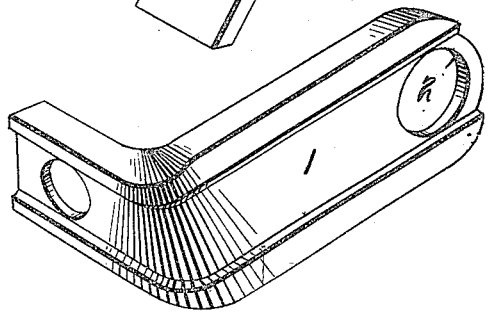

UNITED STATES PATENT OFFICE.

WILLIAM L. BEALL, OF ALBION, MICHIGAN, ASSIGNOR TO GALE MANUFACTURING COMPANY, OF ALBION, MICHIGAN.

CULTIVATOR.

1,143,248.  Specification of Letters Patent.  Patented June 15, 1915.

Application filed June 24, 1914.  Serial No. 847,039.

*To all whom it may concern:*

Be it known that I, WILLIAM L. BEALL, a citizen of the United States, residing at Albion, in the county of Calhoun and State of Michigan, have invented certain new and useful Improvements in Cultivators; and I do hereby declare the following to be a full, clear, and exact description of the invention, such as will enable others skilled in the art to which it appertains to make and use the same.

My invention consists of certain new and useful improvements in that class of agricultural machinery known as "straddle row" cultivators, and relates more particularly to that part of a cultivator designed to raise the plow gangs and includes novel means for retaining the gangs in their raised or inoperative position.

The nature of my invention consists in providing spring pressed latches upon the lifting bars for the gang plows which automatically engage and lock on a portion of the cultivator frame, when the gangs are lifted from their operative position to their raised or inoperative position, thereby facilitating the working of the gangs.

My invention comprises the novel features hereinafter described, illustrated in the accompanying drawings, and more specifically set forth in the appended claims.

In the drawings, Figure 1 represents a side view of a cultivator embodying my invention, with the rear wheel removed. Fig. 2 is a top plan view of the cultivator provided with my improvement. Fig. 3 is a side view of one of the gang bars provided with my improved retaining latch, a portion of one of the gangs being shown in lowered or operating position. Fig. 4 is a similar view showing the latch in section and the gang bar in raised position. Fig. 5 is a perspective view of a detail showing the latch collar. Fig. 6 is a similar view showing the latch clip. Fig. 7 is a perspective view of a plate over which the clip takes.

Referring to the drawings, A is the frame of a cultivator of usual construction, which is composed of diverging bars *a*, connected to the tongue B by a bolt and nut C and also having a brace D bolted to its front end to which the tongue is additionally secured. The rear ends of the bars *a* terminate in sleeves E through which passes the upper horizontal portion of an arch F, the lower horizontal ends of said arch forming axles, upon which the traveling wheels G are mounted. Secured to the frame A by means of U-bolts H, is an arch I, upon the lower horizontal ends of which are loosely mounted sleeves J, the sleeves being held on said arch by means of cotter pins K.

Brackets L are rigidly secured to the sleeves by means of bolts *l* and these brackets are pivotally connected to the gangs M by means of the bolts *m*. This construction forms both vertical and horizontal pivotal supports for the gangs, which may be moved laterally to permit the plows N of the gangs M to be shifted, relative to the growing plants and also allow the gangs to be raised or lowered. Handles O are rigidly connected to the gangs, to facilitate the guiding of the same should the cultivator be used as a walking machine, and stirrups *o* are also provided upon the gangs to control the shifting of the same, when the device is used as a riding cultivator. A seat frame P is ragidly connected to the bars *a* and a seat *p* is provided upon said frame in the usual manner.

The foregoing is descriptive of a form of cultivator, to which my improvements, hereinafter described, are shown attached, but my invention may be applied to any cultivator having gangs pivoted for vertical movement.

My improvement comprises the angular plates 1, which are rigidly secured to the bars *a* and are provided with apertures 2, through which pass the gang rods 3, as best shown in Figs. 3 and 4. These gang rods are pivotally connected at their lower ends to the gangs M by means of bolts 4. The upper ends of the bars 3 are screw threaded at 5 to accommodate hand nuts 6 and between these hand nuts 6 and the plates 1, there are provided upon the rods 3, springs 7 which bear against said nuts 6 and said plates 1 and have a tendency to uplift the rods and plows and prevent strain. The tension of said springs may be adjusted by turning the hand nuts 6. Latches 9 are provided on said rods to automatically lock on the plates 1, when the gangs are lifted, and said latches consist of collars 10 provided on one of their sides with grooves 11, in which rests the locking catches 12. These locking catches 12 have outwardly flaring heads 13 to facilitate their engagement with the plates 1 and shoulders 14, which are locked over the plates when the gangs are lifted. The collars 10 and catches 12 are secured to, and may be adjusted along the rods 3, by means of set screws 15 which pass through apertures in the collars and locking catches, the apertures in the collars being screw threaded. Between the catches 12 and the ends of the set screw, are springs 16, the tension of which may be varied by nuts 17 provided upon said set screws 15. The construction just described forms a spring pressed locking means, the locking catches 12 of which engage the plates 1, when the gangs are lifted.

It will be noted that the latches may be adjusted along the rods to secure the gangs at different vertical heights and that the tension of the springs 16 may be adjusted to take up wear in the locking catches and the plates 1.

When it is desired to raise or lower the gangs the operator sitting upon the seat $p$, simply lifts up or depresses the gangs by means of the stirrups $o$ the retention of the gangs in a raised position being automatic as set forth. Hand levers R are also provided on the gangs M for the purpose of lifting the gangs when the device is used as a walking cultivator.

What I claim and desire to secure by Letters Patent is:—

1. In combination with a cultivator having a frame and gangs pivoted for vertical movement, of rods connecting said frame and said gangs, and adjustable latches provided upon said rods and adapted to automatically engage the frame when the gangs are raised.

2. In a cultivator, a frame, an arch rigidly secured to said frame, gangs pivotally connected to said arch, rods connecting said frame and said gangs, and adjustable latches provided upon said rods for engaging said frame when the gangs are lifted.

3. In a cultivator, a frame, an arch rigidly secured to said frame, gangs pivotally connected to said arch, rods connecting said frame and said gangs, and vertically adjustable latches provided upon said rods, said latches being provided with spring pressed catches.

4. In a cultivator, a frame, an arch rigidly secured to said frame, gangs pivotally connected to said arch, rods connecting said frame and said gangs, and latches provided upon said rods, each of said latches consisting of a collar adjustably secured to each of said rods, a catch provided upon said collar, a set screw securing said collar and said catch to said rod, and a spring interposed between said catch and the outer end of said screw.

5. A latch for holding a gang of a cultivator in raised position, comprising a collar, a catch mounted on said collar, a set screw for securing said catch to said collar, a spring interposed between said catch and the outer end of said set screw, and a nut provided on said screw for adjusting the tension of said spring, said set screw being also adapted to secure the collar at any desired point on a supporting part of the cultivator.

In testimony whereof I affix my signature, in the presence of two witnesses.

WILLIAM L. BEALL.

Witnesses:
G. W. BORTLES,
C. W. ALBERT.

Copies of this patent may be obtained for five cents each, by addressing the "Commissioner of Patents, Washington, D. C."